US012809644B2

(12) United States Patent
Zhang et al.

(10) Patent No.: US 12,809,644 B2
(45) Date of Patent: Nov. 24, 2026

(54) SENSOR DATA PROCESSING METHOD AND APPARATUS

(71) Applicant: Yinwang Intelligent Technologies Co., Ltd., Shenzhen (CN)

(72) Inventors: Yunji Zhang, Hangzhou (CN); Jibin Ma, Dongguan (CN); Dengben Wu, Hangzhou (CN); Qingxue Chen, Hangzhou (CN)

(73) Assignee: Yinwang Intelligent Technologies Co., Ltd., Shenzhen (CN)

( * ) Notice: Subject to any disclaimer, the term of this patent is extended or adjusted under 35 U.S.C. 154(b) by 184 days.

(21) Appl. No.: 18/356,996

(22) Filed: Jul. 21, 2023

(65) Prior Publication Data

US 2023/0359472 A1 Nov. 9, 2023

Related U.S. Application Data

(63) Continuation of application No. PCT/CN2021/125771, filed on Oct. 22, 2021.

(30) Foreign Application Priority Data

Jan. 25, 2021 (CN) ........................ 202110097390.9

(51) Int. Cl.
*G06F 1/16* (2006.01)
*B60W 60/00* (2020.01)
(Continued)

(52) U.S. Cl.
CPC ......... *G06F 9/44526* (2013.01); *B60W 60/00* (2020.02); *G06F 16/258* (2019.01)

(58) Field of Classification Search
None
See application file for complete search history.

(56) References Cited

U.S. PATENT DOCUMENTS 9,477,697 B2 * 10/2016 Ortel ..................... G06F 16/212
9,613,117 B1 * 4/2017 Meritt ................... G06F 16/196
(Continued)

FOREIGN PATENT DOCUMENTS

CN 102292754 A 12/2011
CN 105573760 A 5/2016
(Continued)

*Primary Examiner* — Hyun Nam
(74) *Attorney, Agent, or Firm* — Leydig, Voit & Mayer, Ltd.

(57) ABSTRACT

This application relates to the field of data processing technologies, may be applied to data processing of autonomous driving, and specifically relates to a sensor data processing method and apparatus. The method includes: obtaining configuration information of one or more sensors; loading a corresponding data processing plug-in for each sensor based on the configuration information of the one or more sensors; and receiving, by each data processing plug-in, data of a corresponding sensor, and converting, by each data processing plug-in, the received data of the corresponding sensor into data in a specified format. Based on the technical solution provided in this application, sensor input data may be isolated from an upper-layer service processing algorithm, to quickly adapt to data requirements of different algorithms.

17 Claims, 9 Drawing Sheets

(51) Int. Cl.
*G06F 9/445* (2018.01)
*G06F 16/25* (2019.01)

(56) References Cited

U.S. PATENT DOCUMENTS

| | | | | |
|---|---|---|---|---|
| 9,996,330 | B2 * | 6/2018 | Bregler | G06F 9/44521 |
| 2007/0174416 | A1 * | 7/2007 | Waters | G06F 3/0346 709/217 |
| 2008/0208367 | A1 | 8/2008 | Koehler et al. | |
| 2008/0212537 | A1 * | 9/2008 | Bukai | H04W 36/302 370/332 |
| 2011/0161804 | A1 | 6/2011 | Park et al. | |
| 2014/0081901 | A1 * | 3/2014 | Szymczak | G06F 8/35 707/750 |
| 2015/0331422 | A1 * | 11/2015 | Hartung | G05D 1/02 701/23 |
| 2017/0024133 | A1 * | 1/2017 | Bushman | G06F 3/0664 |
| 2017/0091041 | A1 * | 3/2017 | Liu | G06F 11/1402 |
| 2017/0139411 | A1 * | 5/2017 | Hartung | H04L 12/40 |
| 2018/0101740 | A1 * | 4/2018 | Xie | G06V 10/56 |
| 2019/0222756 | A1 * | 7/2019 | Moloney | H04N 23/45 |
| 2019/0394128 | A1 * | 12/2019 | Yang | H04L 45/748 |
| 2020/0288419 | A1 * | 9/2020 | Gao | H04W 4/46 |
| 2020/0406860 | A1 * | 12/2020 | Mai | B60R 25/31 |
| 2021/0056058 | A1 * | 2/2021 | Lee | G06F 13/4221 |
| 2021/0278854 | A1 * | 9/2021 | Serrano | G06N 3/08 |
| 2021/0335033 | A1 * | 10/2021 | Meng | G06T 17/00 |
| 2022/0225085 | A1 * | 7/2022 | Reed | H04W 12/02 |

FOREIGN PATENT DOCUMENTS

| | | | |
|---|---|---|---|
| CN | 108769109 | A | 11/2018 |
| CN | 104848873 | B | 8/2019 |

* cited by examiner

SENSOR DATA PROCESSING METHOD AND APPARATUS

CROSS-REFERENCE TO RELATED APPLICATIONS

This application is a continuation of International Patent Application No. PCT/CN2021/125771, filed on Oct. 22, 2021, which claims priority to Chinese Patent Application No. 202110097390.9, filed on Jan. 25, 2021. The disclosures of the aforementioned applications are hereby incorporated by reference in their entireties.

TECHNICAL FIELD

This application relates to the field of data processing technologies, and in particular, to a sensor data processing method and apparatus.

BACKGROUND

Autonomous driving is an important development direction of intelligent vehicles and is also a trend of the future automotive industry. In an existing autonomous driving technology, postures and locations of surrounding objects and a vehicle are sensed mainly depending on sensors mounted on the vehicle. An autonomous driving artificial intelligence (AI) algorithm analyzes and processes data collected by the sensors, plans a moving track of the vehicle at a next moment, and controls the vehicle to drive according to the moving track to complete an autonomous driving task.

In the conventional technology, there are many sensor deployment solutions that can sense the postures and locations of the surrounding objects and the vehicle. For example, when the autonomous driving AI algorithm requires data of a vehicle driving speed, a current moving status may be obtained by using a Global Positioning System (GPS) high-precision positioning module, or the vehicle speed may be obtained by calculating a wheel speed of the vehicle by using a wheel speed meter, or the speed may be obtained by configuring a high-precision laser imaging, detection and ranging (LiDAR) system. For another example, when the autonomous driving AI algorithm needs to sense a moving speed of a moving object around the vehicle, a LiDAR may be used to periodically scan the surrounding object to obtain the moving speed of the object; or a millimeter-wave radar may be used to trace the surrounding moving object to obtain the moving speed of the object. For another example, when the autonomous driving AI algorithm needs to sense an obstacle in front of the vehicle, a vision camera may be used to sense the obstacle in front of the vehicle, and then a distance of the obstacle in front of the vehicle is sensed by ranging by using a millimeter-wave radar; or an ultrasonic radar may be used to sense an obstacle within three meters from the vehicle, and a millimeter-wave radar may be used to sense an obstacle beyond three meters from the vehicle.

Different sensor combinations can meet requirements of the autonomous driving AI algorithm for sensing a status of a vehicle body and a status of an object around the vehicle. The autonomous driving AI algorithm is associated with sensor selection. Therefore, research and development costs are greatly increased.

SUMMARY

In view of the foregoing problems in the conventional technology, this application provides a sensor data processing method and apparatus, to reduce association between a sensor deployment mode and an autonomous driving upper-layer service logic or an AI algorithm, and improve reusability of the autonomous driving upper-layer service logic or the AI algorithm.

To achieve the foregoing objective, a first aspect of this application provides a sensor data processing method, including:

- obtaining configuration information of one or more sensors;
- loading a corresponding data processing plug-in for each sensor based on the configuration information of the one or more sensors; and
- receiving, by each data processing plug-in, data of a corresponding sensor, and converting, by each data processing plug-in, the received data of the corresponding sensor into data in a specified format.

The configuration information of the sensor may be obtained from a sensor configuration scheme.

In the above method, the configuration information of a sensor is loaded to the corresponding data processing plug-in, and data processing is performed to obtain the data in the specified format. Through this setting, a format of original input data of a sensor can be fixed to adapt to different data processing procedures.

In an embodiment of the first aspect, the configuration information of a sensor comprises an identifier or a type of the sensor.

In the above method, the sensor in the configuration information may be obtained based on the identifier or type of the sensor, to prepare for loading the data processing plug-in.

In an embodiment of the first aspect, the configuration information of the sensor includes:

an I/O port of the sensor.

The receiving, by each data processing plug-in, data of the corresponding sensor includes:

- receiving, by each data processing plug-in, data of a corresponding sensor through an I/O port of the corresponding sensor.

In an embodiment of the first aspect, the configuration information further includes a data flow relationship between the I/O port of the sensor and the data processing plug-in.

The converting, by each data processing plug-in, the received data of the corresponding sensor into data in a specified format includes:

- converting, by each data processing plug-in, the received data of the corresponding sensor into the data in the specified format based on the data flow relationship.

In the above method, the sensor can be associated with the data processing plug-in through the I/O port and the data flow relationship.

In an embodiment of the first aspect, the configuration information further includes a quantity of sensors.

In the above method, a quantity of data processing plug-ins can be determined based on the quantity of sensors.

In an embodiment of the first aspect, the method further includes: sending the data in the specified format to an upper-layer application.

In the above method, the data in the specified format is sent to the upper-layer application, so that original sensor data is isolated from the upper-layer application, and that reusability of an upper-layer application algorithm is improved.

In an embodiment of the first aspect, the method further includes: applying the data in the specified format to control a vehicle.

A second aspect of this application provides a sensor data processing apparatus, including:

an obtaining module, configured to obtain configuration information of one or more sensors;

a loading module, configured to load a corresponding data processing plug-in for each sensor based on the configuration information of the one or more sensors; and a generation module, configured to receive, by each data processing plug-in, data of a corresponding sensor, and convert, by each data processing plug-in, the received data of the corresponding sensor into data in a specified format.

In an embodiment of the second aspect, the configuration information of a sensor comprises an identifier or a type of the sensor.

In an embodiment of the second aspect, the configuration information of the sensor further includes an I/O port of the sensor.

That each data processing plug-in receives the data of the corresponding sensor includes:

each data processing plug-in receives data of a corresponding sensor through an I/O port of the corresponding sensor.

In an embodiment of the second aspect, the configuration information further includes a data flow relationship between the I/O port of the sensor and the data processing plug-in.

That each data processing plug-in converts the received data of the corresponding sensor into data in a specified format includes:

each data processing plug-in converts the received data of the corresponding sensor into the data in the specified format based on the data flow relationship.

In an embodiment of the second aspect, the configuration information further includes a quantity of sensors.

In an embodiment of the second aspect, the apparatus further includes:

a sending module, configured to send the data in the specified format to an upper-layer application.

In an embodiment of the second aspect, the apparatus further includes: a control module applies the data in the specified format to control a vehicle.

A third aspect of this application provides a vehicle, including:

a plurality of sensors and the apparatus according to the second aspect and any implementation of the second aspect.

A fourth aspect of this application provides a computing device, including:

a bus;

a communications interface, connected to the bus;

at least one processor, connected to the bus; and at least one memory, where the memory is connected to the bus and stores program instructions, and when the program instructions are executed by the at least one processor, the at least one processor is enabled to execute instructions of the sensor data processing method according to the first aspect and any implementation of the first aspect.

A fifth aspect of this application provides a computer-readable storage medium. The computer-readable storage medium stores program instructions. When the program instructions are executed by a computer, the computer is enabled to execute instructions of the sensor data processing method according to any implementation of the first aspect.

In summary, in the technical solutions provided in this application, the original data input by the sensor may be isolated from an upper-layer service, so that association between the sensor and the upper-layer service is reduced, and that reusability of an upper-layer service algorithm is improved.

These aspects and other aspects of this application will be clearer and easier to understand in descriptions of the following (a plurality of) embodiments.

BRIEF DESCRIPTION OF DRAWINGS

The following further describes features of this application and a relationship between the features with reference to the accompanying drawings. All the accompanying drawings are examples, and some features are not shown in actual scales. In addition, some accompanying drawings may omit common features that are not mandatory for this application in the field of this application, or additionally show features that are not mandatory for this application. A combination of the features shown in the accompanying drawings is not intended to limit this application. In addition, in this specification, content referred to by same reference signs is also the same. The specific accompanying drawings are described as follows.

DESCRIPTION OF EMBODIMENTS

Figure 1:
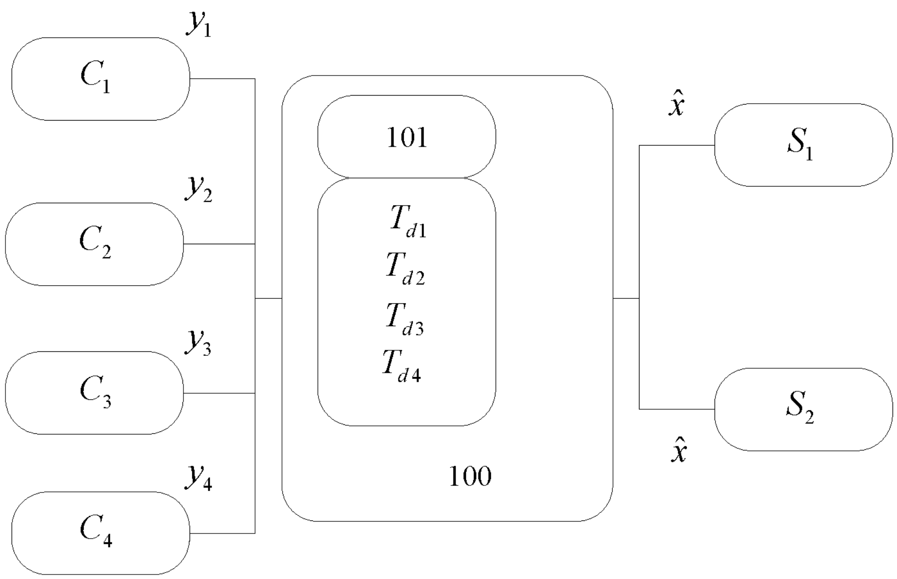
FIG. 1 is a schematic diagram of an application environment of a sensor data combining method according to the conventional technology 2.

In the specification and claims, terms such as “first”, “second”, and “third”, or “module A”, “module B”, and “module C” are merely used to distinguish between similar objects, and do not represent a specific order of the objects. It can be understood that specific orders or sequences may be interchanged if permitted, so that embodiments of this application described herein can be implemented in an order other than the order illustrated or described herein.

Reference numerals that indicate steps such as S110 and S120 in the following descriptions do not necessarily indicate that the steps are definitely performed based on the order. If permitted, the steps may be interchanged in their sequence or may be performed simultaneously.

The term "include" used in the specification and claims should not be construed as being limited to content listed thereafter, and does not preclude other elements or steps. Therefore, the term should be construed as specifying presence of the mentioned feature, entirety, step, or component, but does not preclude presence or addition of one or more other features, entireties, steps, or components and groups thereof. Therefore, the expression "a device including an apparatus A and an apparatus B" should not be limited to a device including only the components A and B.

Reference in this specification to "one embodiment" or "an embodiment" means that a particular feature, structure, or characteristic described in connection with the embodiment is included in at least one embodiment of this application. Therefore, the term "in one embodiment" or "in an embodiment" that appears in each part of this specification does not necessarily refer to a same embodiment, but may refer to a same embodiment. In addition, in one or more embodiments, particular features, structures, or characteristics can be combined in any appropriate manner, as would be apparent to a person of ordinary skill in the art from the present disclosure.

Unless otherwise defined, all technical and scientific terms used in this specification shall have the same meanings as commonly understood by a person skilled in the art to which this application belongs. In case of inconsistency, the meaning described in this specification or the meaning obtained based on the content described in this specification shall prevail. In addition, the terms used in this specification are merely intended to describe embodiments of this application but not intended to constitute any limitation on this application.

Before specific embodiments of this application are further described in detail, nouns and terms in the embodiments of this application, and corresponding purposes/roles/functions and the like of the nouns and terms in this application are described. The nouns and terms in the embodiments of this application are applicable to the following explanations:

1. Data interface forwarding framework (Interface Forwarding, INTF): The data interface forwarding framework in the embodiments of this application is designed based on data flow and I/O port abstraction, to isolate I/O receiving and sending of specific hardware from data processing. A person using the data interface forwarding framework for development only needs to pay attention to an overall data processing procedure, but does not need to pay attention to specific data sending and receiving processes. Therefore, development efficiency can be improved. In addition, when the data interface forwarding framework is used for development, a data processing procedure is developed and managed in plug-in mode. In this way, when different service algorithms use a same data collector deployment solution, quick adaptation can be implemented, and when a same service algorithm uses different data collector deployment solutions, quick adaptation can be implemented, thereby improving overall development efficiency of a sensor data layer.
2. Autonomous driving solution (ADS): The autonomous driving solution refers to a deployment solution that implements autonomous driving of a vehicle based on a mechanical design of the vehicle, an electronic control unit design of the vehicle, vehicle body sensor selection, an autonomous driving AI algorithm, and the like.
3. Data flow relationship: In this application, the data flow relationship indicates a data processing flow direction. For example, in an embodiment, a data flow is assembled and configured based on an I/O port and a data processing plug-in. A configured data processing procedure may include: receiving original data through the configured I/O port, and processing, by the configured processing plug-in, the original data to generate abstract data in a fixed format.

In a sensor data combining solution, at least one sensor is used to monitor a driver behavior, and driver behavior related data obtained by the sensor is provided. For example, the driver behavior related data may include a driver's head location and the driver's gaze direction. Driver behavior unrelated data is provided by using at least one external sensor. For example, the driver behavior unrelated data includes a location and a speed of an object around a vehicle driven by the driver. The surrounding object may be a surrounding vehicle, a building, or the like. When an error between a measured value of the driver behavior related data at a current moment and a predicted value of the data is within a specified first range, and an error between a measured value of the driver behavior unrelated data at the current moment and a predicted value of the data is within a specified second range, sensor data of the driver behavior related data and sensor data of the driver behavior unrelated data are combined.

The sensor data combining solution provided herein is abstracted from a mathematical method of data fusion, and does not consider impact of differences in sensor selection and deployment on an algorithm layer in actual application of a specific algorithm on a vehicle. Therefore, the technical solution cannot adapt to a problem of algorithm inapplicability caused by a change in sensor selection and deployment, resulting in an increase of research and development costs and a longer research and development period.

There is another sensor data combining method. The method includes the following steps:

(1) searching for possible anomalies of at least two sensors referred to as sensors of interest, including the following substeps:

(1a) for each sensor of interest, calculating a detection deviation, where the detection deviation is proportional to an absolute value of a difference between a measurement result provided by the sensor of interest and an estimate of a parameter calculated based on a measurement result provided by another sensor of interest;

(1b) for each sensor of interest, comparing the detection deviation of the sensor of interest with a corresponding predetermined threshold; and (1c) determining, based on a comparison result by using a determined total false alarm probability, that one of the sensors of interest is abnormal or not abnormal.

(2) combining the measurement results provided by the sensors of interest, to provide a final estimate of the parameter.

FIG. 1 shows an application environment of the conventional technology 2. The final estimated parameter is x(t). For simplicity of marking, this parameter is marked as in the following.

At each moment, sensors $C_1$, $C_2$, $C_3$, and $C_4$ respectively obtain measurement results $y_1(t)$ $y_2(t)$, $y_3(t)$ and $y_4(t)$ of the parameter x. Then the measurement results are provided to a data combining module 100. For simplicity of marking, these measurement results are marked as $y_1$, $y_2$, $y_3$, and $y_4$ in FIG. 1 and the following. The sensors $C_1$, $C_2$, $C_3$ and $C_4$ may be sensors of a same type, or may be sensors of different types. A memory 101 in the data combining module 100 receives predetermined thresholds $T_{d1}$, $T_{d2}$, $T_{d3}$, $T_{d4}$ respectively associated with the sensors $C_1$, $C_2$, $C_3$, and $C_4$. Based on the measurement results $y_1$, $y_2$, $y_3$, and $y_4$ and the predetermined thresholds $T_{d1}$, $T_{d2}$, $T_{d3}$, and $T_{d4}$, the data combining module 100 outputs the final estimated $\hat{x}$ of the parameter x, and sends the final estimated $\hat{x}$ to a system communicating with the data combining module 100. Generally, the data combining module 100 communicates with at least one system. Herein, two avionics systems $S_1$ and $S_2$ are used as an example. The final estimated $\hat{x}$ of the parameter x, output by the data combining module 100, is sent to the avionics system $S_1$ and the avionics system $S_2$ separately.

The sensor data combining method provided herein focuses on improving data precision and reliability, but does not consider how to enable an algorithm layer to quickly adapt to sensors of different vehicle models in actual engineering application and development. An algorithm is not readily portable and is not universal for different application platforms or application scenarios, resulting in an increase of research and development costs and a longer research and development period.

This application provides a sensor data processing method, to develop different types of sensors in plug-in mode, and encapsulate data output by a data processing plug-in in a specified format, so that a developed data processing plug-in can be reused for sensor deployment and combination for different vehicle models, thereby improving adaptation efficiency of sensor deployment solutions of different vehicle models. The data processing plug-in may be a software processing module. Further, the data in the specified format and service processing logic may be associated with an autonomous driving AI algorithm through an abstract interface, so that the service processing logic and the autonomous driving AI algorithm are applicable to different vehicle models, and a reuse rate of the service processing logic and the autonomous driving AI algorithm is increased, and development costs of the service processing logic and the autonomous driving AI algorithm are reduced.

The following describes the embodiments of this application in detail with reference to the accompanying drawings. First, a scenario to which the sensor data processing method provided in the embodiments of this application is applied is described.

The solutions in the embodiments of this application may be applied to a vehicle or an in-vehicle system of a vehicle, for example, an electronic control unit (ECU) or a domain control unit (DCU). The system or the control unit may be an element in a hardware device, or may be a software function running on dedicated hardware, or may be an instantiated virtualization function on a platform (for example, a cloud platform or a hardware platform). Optionally, functions of the foregoing system or control unit may be implemented by one device, or may be implemented by a plurality of devices together, or may be one functional module in one device. This is not specifically limited in the embodiments of this application.

The sensor data processing method provided in the embodiments of this application may be applied to an assisted driving platform and an autonomous driving platform, and is used to process sensor data and transmit processed data to the service processing logic or the autonomous driving AI algorithm, to isolate a sensor from the service processing logic or the autonomous driving AI algorithm, to quickly adapt to sensor deployment solutions of different vehicle models. The service processing logic is processing logic for controlling vehicle driving, for example, processing logic for controlling vehicle acceleration and deceleration in a vehicle driving process, processing logic for controlling vehicle obstacle avoidance in a vehicle driving process, and processing logic for controlling vehicle steering in a vehicle driving process. The autonomous driving AI algorithm is various recognition algorithms, for example, an algorithm for identifying a distance between a vehicle and a surrounding obstacle, and an algorithm for identifying an ambient temperature of the vehicle. It should be noted that the service processing logic in the embodiments of this application may be software processing logic.

Figure 2:
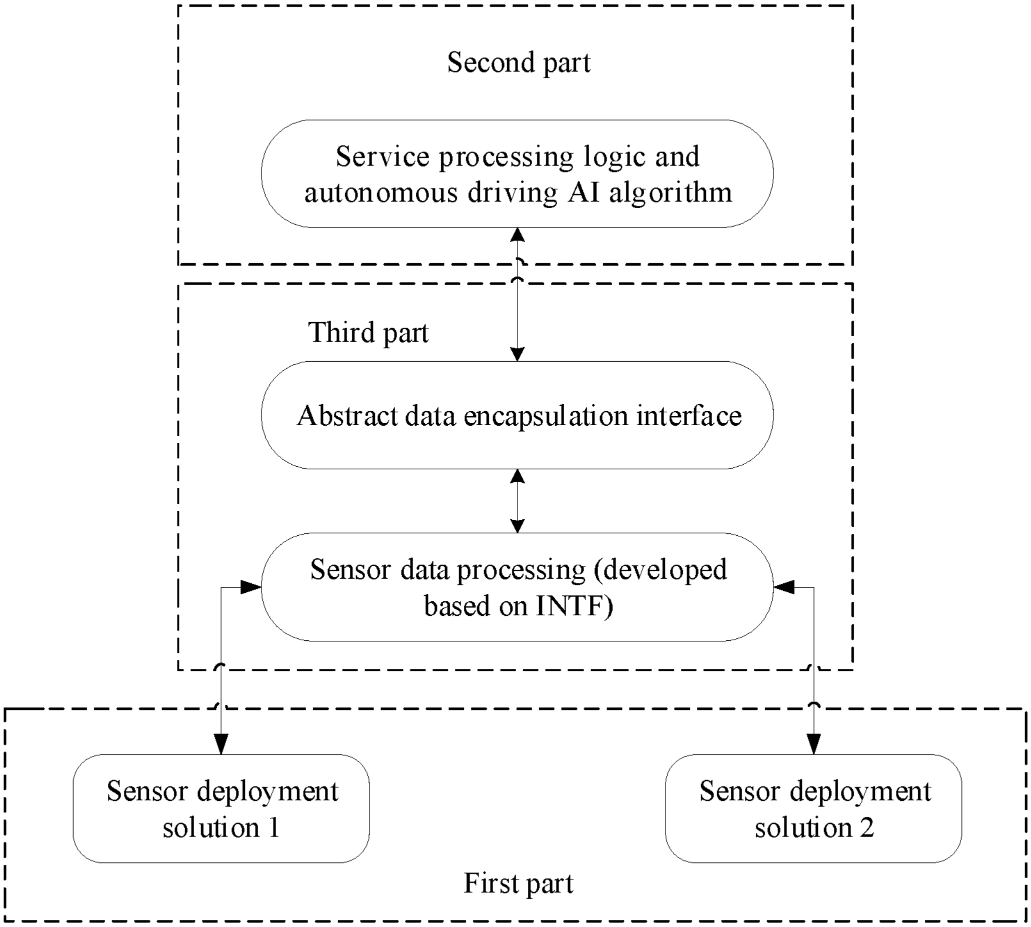
FIG. 2 is a diagram of an architecture of a sensor data processing method according to an embodiment of this application.

FIG. 2 is a diagram of an architecture of a sensor data processing method according to an embodiment of this application. The architecture specifically includes the following parts. The first part is a sensor deployment solution, for example, a sensor deployment solution 1 and a sensor deployment solution 2 shown in FIG. 2, where the sensor deployment solution includes sensor configuration information. The second part is service processing logic and an autonomous driving AI algorithm. The third part is sensor data processing and an abstract data encapsulation interface processing. As shown in FIG. 2, the sensor data processing is developed based on INTF. The abstract data encapsulation interface shown in FIG. 2 is used for encapsulation, and the abstract data encapsulation interface is configured to implement encapsulation of data in a specified format. The sensor data processing and the abstract data encapsulation interface process in the third part are used to isolate the sensor deployment solution in the first part from the service processing logic and the autonomous driving AI algorithm in the second part. The sensor data processing and the abstraction data encapsulation interface process are used to execute instructions of the sensor data processing method provided in this embodiment of this application. In this application, the sensor data processing and the encapsulation process are developed and managed in plug-in mode. A developed data processing plug-in is directly portable for use, to adapt to different sensor deployment solutions more efficiently. In addition, a fixed abstract interface is used to encapsulate data in a specified format, so that the sensor deployment solution can be isolated from the service processing logic and the autonomous driving AI algorithm, to shield the service processing logic and the autonomous driving AI algorithm from impact of the sensor deployment solution. In this way, the service processing logic and the autonomous driving AI algorithm can be efficiently used, reusability thereof is improved, and development costs are reduced.

The following describes in detail a sensor data processing method according to an embodiment of this application with reference to the drawings.

Figure 3:
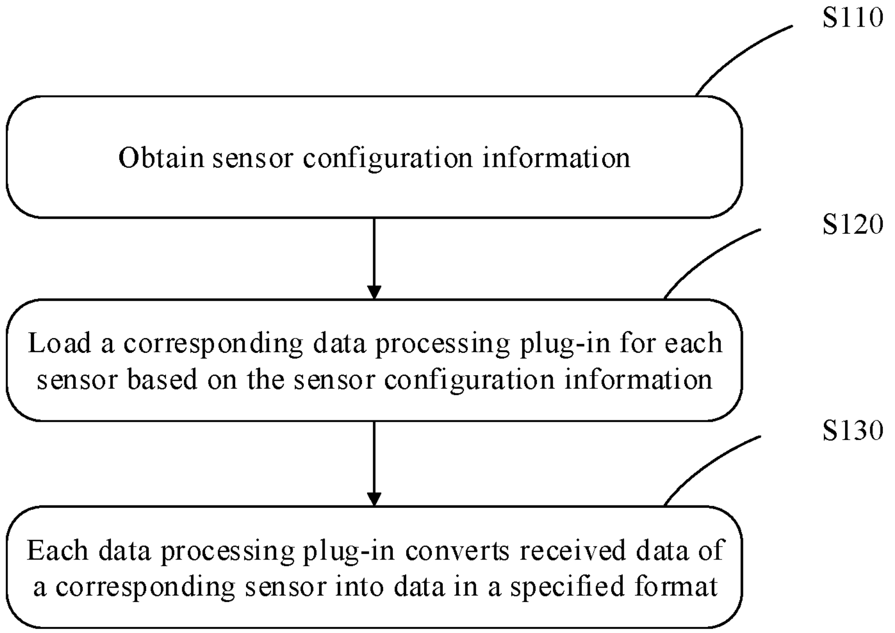
FIG. 3 is a flowchart of a sensor data processing method according to an embodiment of this application.

Referring to a flowchart shown in FIG. 3, an embodiment of a sensor data processing method provided in this application is described. The method mainly includes steps S110 to S130. The following sequentially describes the steps.

S110. Obtain sensor configuration information.

In this embodiment, the sensor configuration information includes but is not limited to one or more of the following: an identifier or a type of a sensor, an I/O port configured for each sensor, a data flow relationship between an I/O port and a data processing plug-in, and a quantity of sensors.

The sensor identifier may be a sensor name or an ID identifier. For example, the sensor name may be a Continental 408 millimeter-wave radar, a Fuji ultrasonic radar, or a 32-wire Hesai LiDAR. The ID identifier may identify an ID of a sensor, so that different sensors are distinguished by using different sensor ID identifiers. The I/O port includes but is not limited to a controller area network (CAN) port, a CANFD (CAN with Flexible Data-Rate) port, a universal asynchronous receiver and transmitter (UART) port, or a robot operating system (ROS) port. The data processing plug-in receives data of a sensor through the I/O port of the corresponding sensor. The quantity of sensors may be determined according to a sensor deployment solution.

When the sensor data processing method provided in this embodiment is applied to a vehicle, the sensor configuration information in this step may be prestored in a cloud, a server, or a storage medium of the vehicle; the sensor configuration information may be prestored in a related file of the cloud and the server; and the sensor configuration information may be further prestored in corresponding memory space of the storage medium of the vehicle, where the corresponding memory space of the storage medium is memory space in which no loss is caused in case of a power failure. The prestored sensor configuration information is read when the vehicle is initialized.

S120. Load a corresponding data processing plug-in for each sensor based on the sensor configuration information.

For example, a type and a quantity of data processing plug-ins required in the sensor configuration information are obtained, and the data processing plug-ins are loaded.

When the sensor data processing method provided in this embodiment is applied to the vehicle, the data processing plug-in in this step may be prestored in the cloud, the server, or the storage medium of the vehicle in a form of a plug-in, where the data processing plug-in is in a one-to-one correspondence with a configuration template of the plug-in. The prestored data processing plug-in is invoked according to a received instruction for invoking the data processing plug-in, to complete a corresponding data processing task. In addition, the data processing plug-in may be updated based on a function enabled by the vehicle and the sensor deployment solution.

S130. Each data processing plug-in converts received data of a corresponding sensor into data in a specified format. In this step, the data in the specified format is generated by using the data processing plug-in.

In addition, the data may be further sent to an upper-layer application, for example, service processing logic or an autonomous driving AI algorithm.

The following describes in detail a sensor data processing method according to another embodiment of this application with reference to the drawings. The method is implemented based on sensor data processing and an encapsulation process.

First, the sensor data processing in this embodiment is described.

The sensor data processing includes processing received original sensor data and encapsulating the data in a specified data format. Specifically, the sensor data processing includes a data configuration process, a data flow assembly process, and a data forwarding process.

The data configuration process includes obtaining sensor configuration information, and is specifically: performing configuration in a configuration template based on a specific vehicle model and/or according to a specific sensor deployment solution, to obtain a configuration file. The configuration herein is described by using two aspects of configuration as an example. The first aspect is to configure an I/O port and a data processing plug-in that need to be used, and the second aspect is to configure a data flow between the I/O port and the data processing plug-in. The I/O port includes but is not limited to a CAN port, a CANFD port, a serial port, a network port, and communication middleware (such as a ROS) port. The data flow between the I/O port and the data processing plug-in is determined according to the specific sensor deployment solution. Based on the data flow, the I/O port and the data processing plug-in may be associated. For example, when the sensor deployment solution is to measure a distance between a vehicle and a surrounding obstacle by using a millimeter-wave radar, the data flow is: millimeter-wave radar→CAN port→millimeter-wave radar plug-in.

The data flow assembly process includes assembling the I/O port and the data processing plug-in based on the data flow between the I/O port and the data processing plug-in that is configured in the second aspect in the data configuration process.

The data forwarding process is used to start the data flow assembled in the data flow assembly process, and forward the original data collected by the sensor in real time to the data processing plug-in, so that the original data is processed by the data processing plug-in and encapsulated into data in a specified format.

Figure 4:
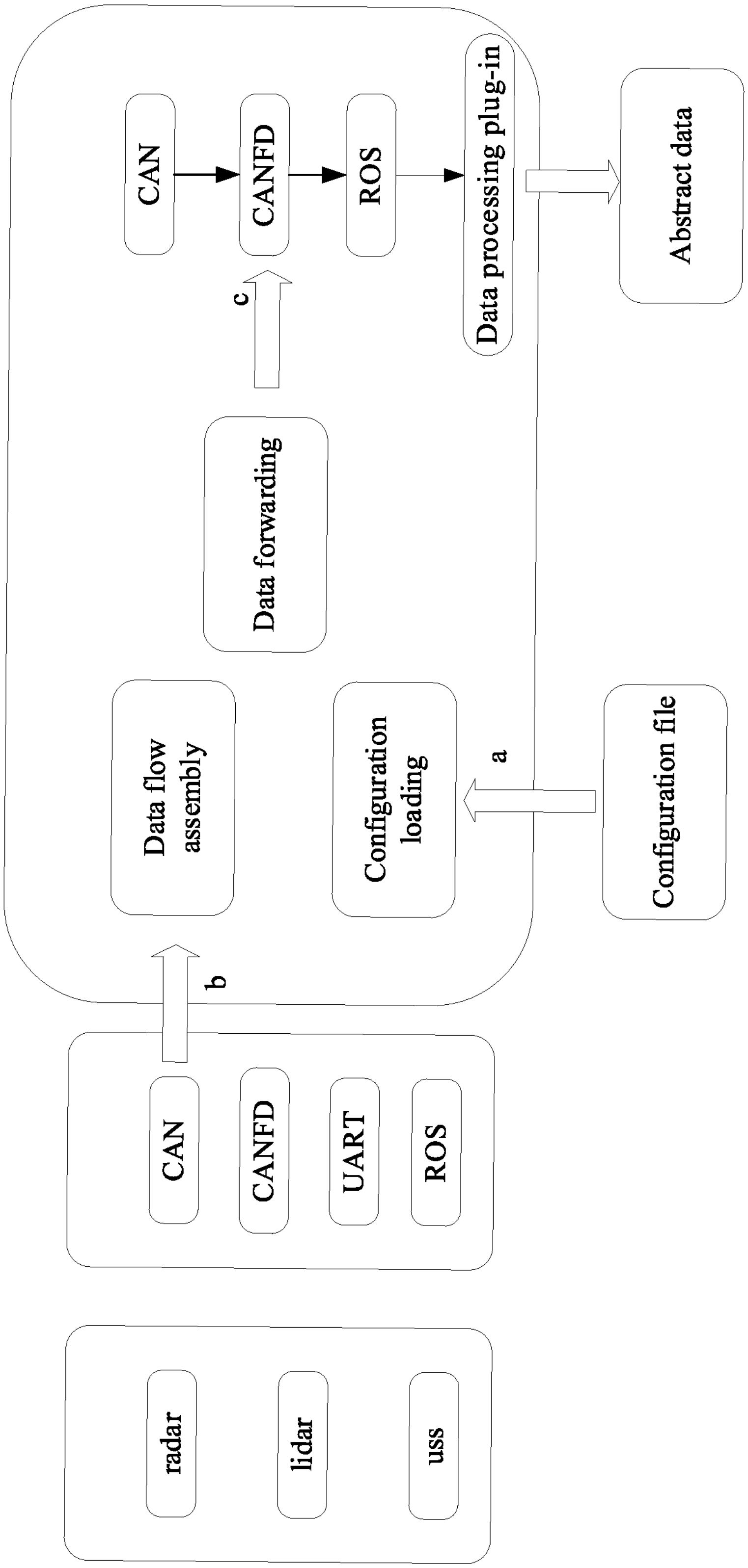
FIG. 4 is a specific schematic flowchart of a sensor data processing procedure during running according to an embodiment of this application.

FIG. 4 is a specific schematic flowchart of a sensor data processing procedure during running. First, as shown in a in FIG. 4, a configuration file is obtained, and the configuration file is loaded. Specifically, the procedure includes: configuring an I/O port that needs to be used, configuring a data processing plug-in that needs to be used, and configuring a data flow between the I/O port and the data processing plug-in; then, as shown in b in FIG. 4, obtaining the required I/O port from a pre-constructed I/O port library based on the configuration file, for example, CAN port, CANFD port, UART port, or ROS port shown in FIG. 4; and obtaining the required data processing plug-in from a pre-constructed data processing plug-in library based on the configuration file, for example, radar, LiDAR, or USS (ultrasonic radar) shown in FIG. 4, and assembling a data flow based on a data flow in the configuration file. The process of assembling the data flow is a process of connecting an actual sensor to the data processing plug-in through the corresponding port. Finally, as shown in c in FIG. 4, the data flow assembled in step b is started, and original data collected by the sensor is forwarded to the data processing plug-in through a corresponding I/O port. After the original data is processed by the data processing plug-in, abstract data in a fixed format is generated. For example, as shown in FIG. 4, the original data collected by the sensor is transferred to a CANFD port through a CAN port, and then transferred to an ROS port through the CANFD port and then processed by the data processing plug-in, and abstract data in a fixed format is generated.

Figure 5:
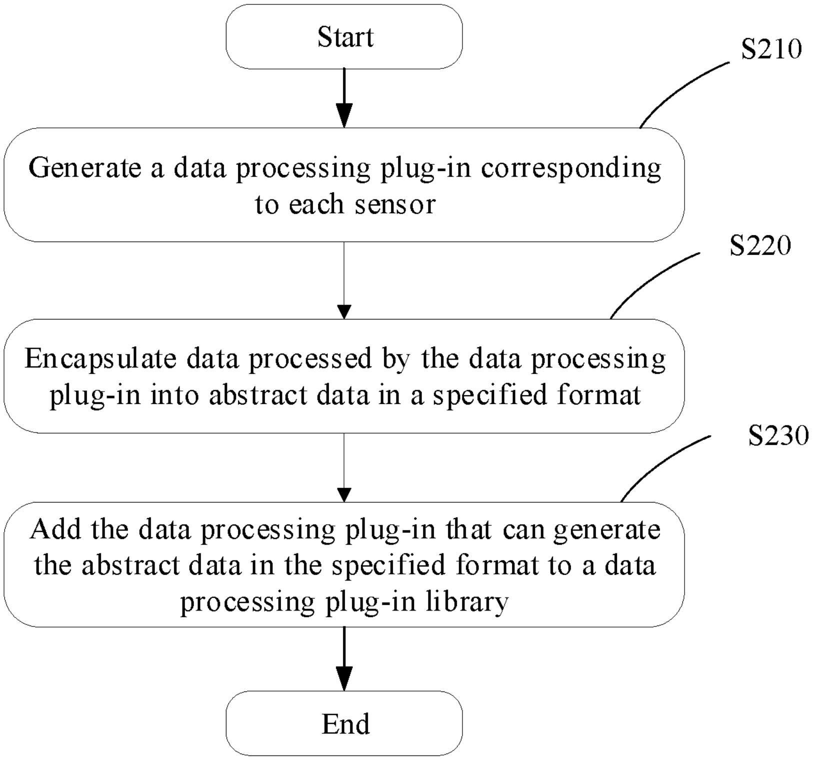
FIG. 5 is a flowchart for constructing a data processing plug-in library according to an embodiment of this application.

As shown in FIG. 5, in another embodiment of this application, a specific implementation method for constructing a data processing plug-in library is provided. The method mainly includes steps S210 to S230. The following sequentially describes the steps.

S210. Generate a data processing plug-in corresponding to each sensor.

For example, a data processing plug-in that can process original data of a sensor is generated based on a specific model of the sensor.

S220. Encapsulate data processed by the data processing plug-in into abstract data in a specified format.

S230. Add the data processing plug-in that can generate the abstract data in the specified format to a data processing plug-in library, so that the data processing plug-in is directly used subsequently without re-development.

According to the foregoing method, a data processing plug-in library may be provided, where the data processing plug-in library includes a plurality of data processing plug-ins, and each data processing plug-in is configured to process original data of a corresponding sensor in response to configuration information of the sensor, and output data in a specified format.

A sensor plug-in library is constructed based on this embodiment. When sensor deployment solutions of different vehicle models are different, a developed sensor, that is, an existing plug-in in the data processing plug-in library, is readily portable and reusable. Therefore, development efficiency can be greatly improved.

In another embodiment of this application, a specific implementation of a data configuration process is provided. The data configuration process is implemented based on an I/O port and a data flow. In actual engineering, available sensor models are limited. A same sensor model is used in different sensor deployment solutions, but connected ports and a quantity of connected sensors are different. For example, sensor deployment solutions shown in Table 1 can both achieve an adaptive cruise objective. In solution 1, three Continental 408 millimeter-wave radars are selected to connect to a central computer of a vehicle through CAN ports 2, 3, and 4. In solution 2, five Continental 408 millimeter-wave radars are selected to connect to a central computer of a vehicle through CAN ports 1, 2, 3, 4, and 5. It can be learned from the sensor deployment solutions in solution 1 and solution 2 that only the quantity of sensors and the connection mode are different in the two deployment solutions. Therefore, a data processing plug-in can be definitely reused. To simplify a configuration mode of a data configuration process, in this embodiment, a configuration of each sensor model may be made into a configuration template, where the configuration template includes a data flow required for using the data processing plug-in and a required I/O port type. For example, content of a configuration template of a Continental 408 millimeter-wave radar plug-in includes: an I/O port required by the plug-in is a CAN port, and a data flow required by the plug-in is millimeter-wave radar→CAN port→millimeter-wave radar plug-in. In this case, during the configuration, a user needs to configure only a quantity of required Continental 408 millimeter-wave radar plug-ins and specific connected I/O ports, to generate a configuration file.

TABLE 1

| Solution No. | Type of used sensor | Quantity of used sensors | Mode of connecting to the center computer of the vehicle |
|---|---|---|---|
| 1 | Continental 408 millimeter-wave radar | 3 | Connect to CAN ports 2, 3, and 4 |
| 2 | Continental 408 millimeter-wave radar | 5 | Connect to CAN ports 1, 2, 3, 4, and 5 |

For example, when three millimeter-wave radars are selected to check obstacles around the vehicle, the configuration template includes: a required I/O port is a CAN port, and a required data flow is: receiving original data collected by a millimeter-wave radar→processing by a data processing plug-in→abstract data in a specified format. The configuration template is saved. When the user needs to invoke the millimeter-wave radar data processing plug-in, the user only needs to configure a quantity of millimeter-wave radars using the plug-in and an access channel to generate a corresponding configuration file.

The configuration template of the data processing plug-in may include information used to identify a sensor corresponding to the data processing plug-in, for example, a sensor type and a product name, and a data flow required by the data processing plug-in and a required I/O port type. Parameters of the configuration template may include but are not limited to a quantity of sensors and I/O ports of the sensors.

Figure 6:
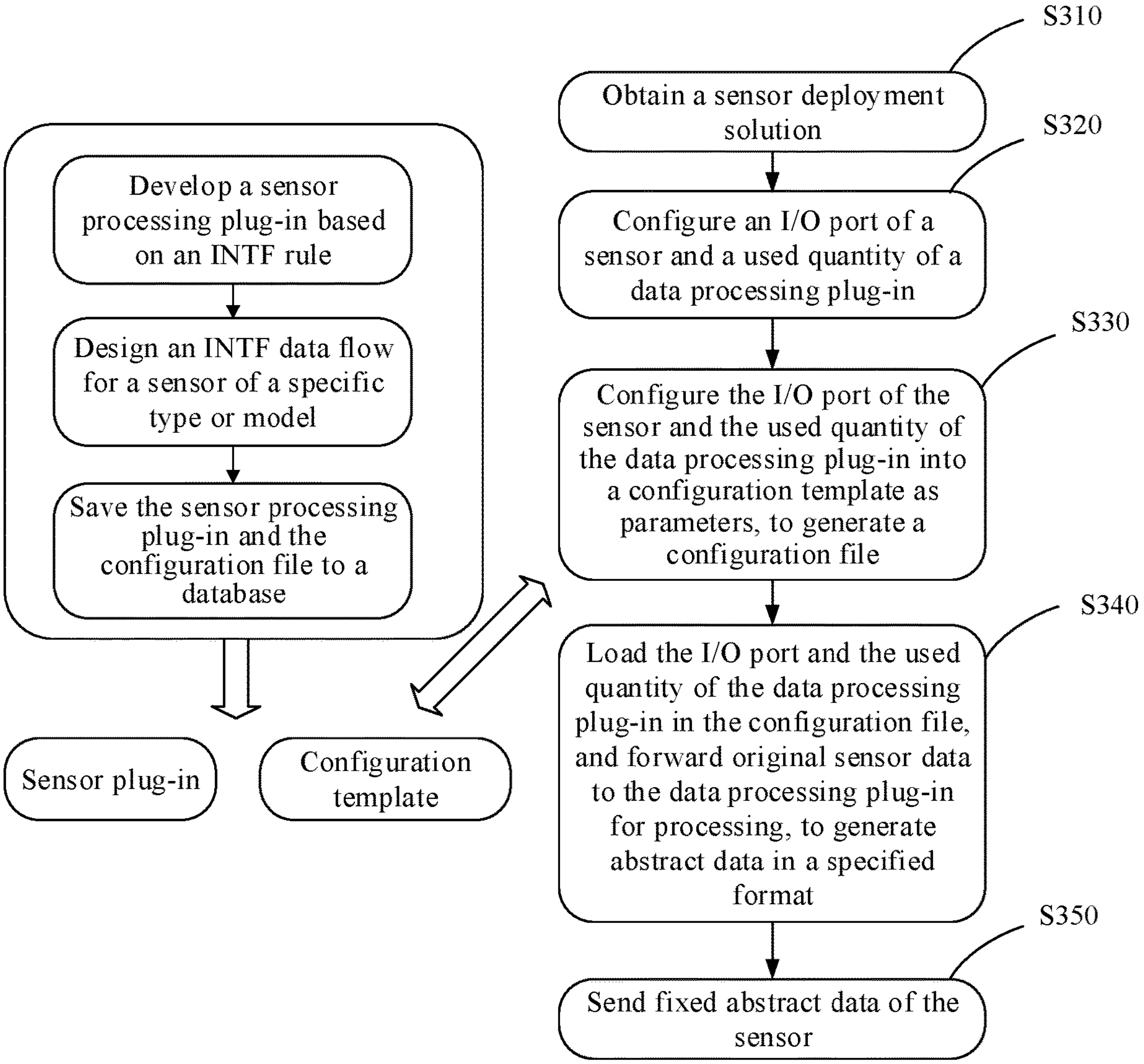
FIG. 6 is a flowchart of a sensor data processing method in a data configuration process according to an embodiment of this application.

FIG. 6 is a flowchart of a sensor data processing method in a data configuration process according to an embodiment of this application. The method mainly includes steps S310 to S350. The following sequentially describes the steps.

S310. Obtain a sensor deployment solution.

S320. Configure an I/O port of a sensor and a used quantity of a data processing plug-in according to the sensor deployment solution.

S330. Configure the I/O port of the sensor and the used quantity of the data processing plug-in into a configuration template as parameters, to generate a configuration file.

S340. Load the I/O port and the used quantity of the data processing plug-in in the configuration file, and forward original sensor data to the data processing plug-in for processing, to generate abstract data in a specified format.

S350. Send the abstract data in the specified format.

The I/O port is prestored in a pre-constructed I/O port library, and the data processing plug-in is prestored in a pre-constructed data processing plug-in library. When the required data processing plug-in does not exist in the data processing plug-in library, a related data processing plug-in needs to be developed and stored in the data processing plug-in library for use before step S320 is performed Based on the configuration template of the data processing plug-in in the data configuration process provided in this embodiment, a configuration process of a user is greatly simplified. For an existing data processing plug-in in the data processing plug-in library, data adaptation can be completed by simply configuring a quantity of data processing plug-ins and connected I/O ports. The configuration parameters are simple and can quickly meet requirements of different sensor deployment solutions.

Based on the sensor data processing and the encapsulation process in the foregoing embodiments, the sensor deployment solution and the service processing logic are isolated from the autonomous driving AI algorithm, so that the service processing logic and the autonomous driving AI algorithm can be efficiently ported in different vehicle models and different application scenarios.

The following uses four sensor deployment solutions as an example to describe an INTF development process in a sensor data processing method provided in an embodiment of this application. Table 2 shows four sensor deployment solutions.

Solution 1 is to select three Continental 408 millimeter-wave radars, one 64-wire Hesai LiDAR, four Fuji ultrasonic radars, and two Sony cameras. In solution 1, three Continental 408 millimeter-wave radars are sequentially connected to CAN ports 1 to 3, one 64-wire Hesai LiDAR is connected to network adapter 1, four Fuji ultrasonic radars are connected to CAN port 4, and two Sony cameras are connected to camera sockets 1 and 2.

Solution 2 is to select five Continental 408 millimeter-wave radars, two 32-wire Hesai LiDARs, and six Sony cameras. In solution 2, five Continental 408 millimeter-wave radars are sequentially connected to CAN ports 1 to 5, two 32-wire Hesai LiDARs are sequentially connected to network adapters 1 and 2, and six Sony cameras are connected to camera sockets 1 to 6.

Solution 3 is to select six Continental 408 millimeter-wave radars, two 32-wire Hesai LiDARs, four Fuji ultrasonic radars, and eight Sony cameras. In solution 3, six Continental 408 millimeter-wave radars are sequentially connected to CAN ports 1 to 6, two 32-wire Hesai LiDARs are sequentially connected to network adapters 1 and 2, four Fuji ultrasonic radars are connected to CAN port 7, and eight Sony cameras are connected to camera sockets 1 to 8.

Solution 4 is to select six Continental 408 millimeter-wave radars, 12 Fuji ultrasonic radars, and eight Sony cameras. Six Continental 408 millimeter-wave radars are sequentially connected to CAN ports 1 to 6, 12 Fuji ultrasonic radars are connected to CAN port 8, and eight Sony cameras are connected to camera sockets 1 to 8.

TABLE 2

| | Sensor deployment solution 1 | Sensor deployment solution 2 | Sensor deployment solution 3 | Sensor deployment solution 4 |
|---|---|---|---|---|
| Used sensor | Three Continental 408 millimeter-wave radars<br>One 64-wire Hesai LiDAR<br>Four Fuji ultrasonic radars<br>Two Sony cameras | Five Continental 408 millimeter-wave radars<br>Two 32-wire Hesai LiDARs<br>Six Sony cameras | Six Continental 408 millimeter-wave radars<br>Two 32-wire Hesai LiDARs<br>Four Fuji ultrasonic radars<br>Eight Sony cameras | Six Continental 408 millimeter-wave radars<br>12 Fuji ultrasonic radars<br>Eight Sony cameras |
| Mode of connecting to an autonomous driving system | 1. Connect the millimeter-wave radars to CAN ports 1-3<br>2. Connect the LiDAR to network adapter 1<br>3. Connect the ultrasonic radars to CAN port 4<br>4. Connect the cameras to camera sockets 1 and 2 | 1. Connect the millimeter-wave radars to CAN ports 1-5<br>2. Connect the LiDARs to network adapters 1 and 2<br>3. Connect the cameras to camera sockets 1 to 6 | 1. Connect the millimeter-wave radars to CAN ports 1-6<br>2. Connect the LiDARs to network adapters 1 and 2<br>3. Connect the ultrasonic radars to CAN port 7<br>4. Connect the cameras to camera sockets 1 to 8 | 1. Connect the millimeter-wave radars to CAN ports 1-6<br>3. Connect the ultrasonic radars to CAN port 8<br>4. Connect the cameras to camera sockets 1 to 8 |

Figure 7:
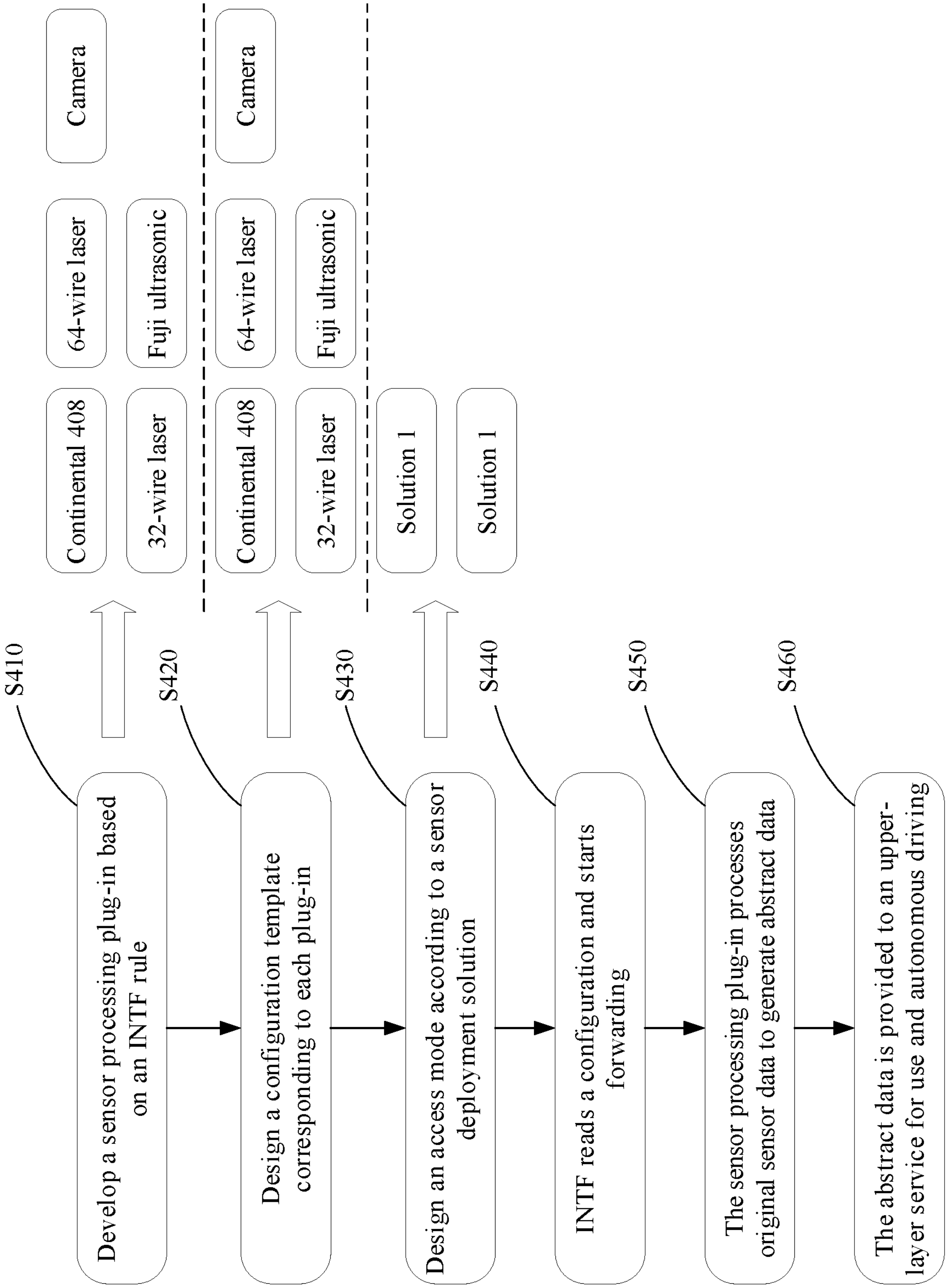
FIG. 7 is a flowchart of INTF development according to an embodiment of this application.

With respect to the foregoing four sensor deployment solutions, the following describes a complete process of a sensor data processing method on a basis that no data processing plug-in corresponding to the foregoing sensor exists in a data processing plug-in library. As shown in FIG. 7, the complete process includes steps S410 to S460, where steps S410 and S420 are a process of developing a data processing plug-in, step S430 is a process of connecting a sensor to the data processing plug-in, steps S440 and S450 are a process of performing data processing by using the plug-in to obtain data in a specified format, and step S460 is a process of providing the data in the specified format to an upper-layer application to use. The following sequentially describes the steps.

S410. Develop data processing plug-ins of sensors in the foregoing deployment solution. The plug-ins include a Continental 408 millimeter-wave radar plug-in, a 64-wire Hesai LiDAR plug-in, a Fuji ultrasonic radar plug-in, a 32-wire Hesai LiDAR plug-in, and a Sony camera plug-in. The developed plug-ins are stored in the data processing plug-in library for use in different sensor deployment solutions.

S420. Design a configuration template corresponding to each data processing plug-in, where the configuration template is in a one-to-one correspondence with the data processing plug-in. The configuration templates include a Continental 408 millimeter-wave radar configuration template, a 64-wire Hesai LiDAR configuration template, a Fuji ultrasonic radar configuration template, a 32-wire Hesai LiDAR configuration template, and a Sony camera configuration template.

S430. Design an access mode according to the sensor deployment solution. The sensor deployment solution 1 is used as an example herein. This deployment solution is to select three Continental 408 millimeter-wave radars, one 64-wire Hesai LiDAR, four Fuji ultrasonic radars, and two Sony cameras. The configuration template of the data processing plug-in corresponding to each sensor (radar) in the deployment solution is obtained, and a related parameter in the configuration template, that is, a specific access channel of the sensor, is set, so that a configuration file is obtained. The following provides the configuration file of this solution, as shown in Table 3.

TABLE 3

| Configuration file of sensor configuration solution 1 | |
|---|---|
| Sensor No. | 1 |
| Sensor model | Continental 408 millimeter-wave |
| Sensor access channel | CAN port 1 |
| Sensor No. | 2 |
| Sensor model | Continental 408 millimeter-wave |
| Sensor access channel | CAN port 2 |

TABLE 3-continued

| Configuration file of sensor configuration solution 1 | |
|---|---|
| Sensor No. | 3 |
| Sensor model | Continental 408 millimeter-wave |
| Sensor access channel | CAN port 3 |
| Sensor No. | 4 |
| Sensor model | 64-wire Hesai LiDAR |
| Sensor access channel | Network adapter 1 |
| Sensor No. | 5 |
| Sensor model | Fuji ultrasonic radar |
| Sensor access channel | CAN port 4 |
| Sensor No. | 6 |
| Sensor model | Sony camera |
| Sensor access channel | Camera socket 1 |
| Sensor No. | 7 |
| Sensor model | Sony camera |
| Sensor access channel | Camera socket 2 |

S440. INTF reads the configuration file in S430, and starts a data flow to forward data, that is, a process of obtaining sensor configuration information and loading a corresponding data processing plug-in for each sensor based on the sensor configuration information in steps S110 and S120 in the foregoing embodiment.

S450. The data processing plug-in processes original sensor data to generate abstract data in a specified format, that is, each data processing plug-in converts the received data of a corresponding sensor into data in a specified format in step S130 in the foregoing embodiment.

S460. The abstract data in the specified format is provided to upper-layer service processing logic and an autonomous driving AI algorithm for use.

According to the technical solution provided in this embodiment of this application, sensors of different models are developed in plug-in mode, so that the sensors are combined for use more flexibly and that a developer performs development conveniently based on existing content. In addition, the sensor deployment solution for different vehicle models is simplified, and the service processing logic and autonomous driving AI algorithm can be reused. Therefore, development efficiency is improved, and development costs are reduced.

Another embodiment of this application provides a vehicle control method. In this embodiment, data in a specified format is generated by using the sensor data processing method in the foregoing embodiment, and the data in the specified format is applied to control a vehicle.

Based on the method provided in this embodiment, a vehicle control algorithm can be reused.

Figure 8:
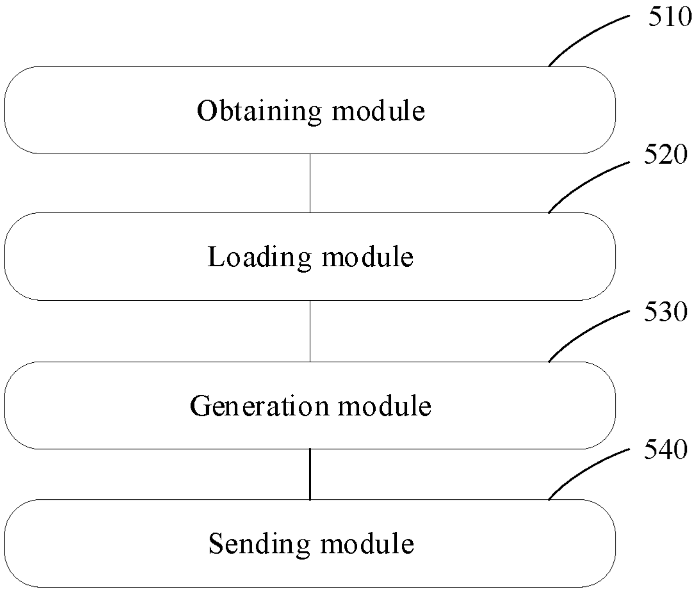
FIG. 8 is a schematic diagram of a structure of a sensor data processing apparatus according to an embodiment of this application.

As shown in FIG. 8, another embodiment of this application provides a sensor data processing apparatus. The apparatus may be deployed in a vehicle, and may be an in-vehicle system, for example, a device such as an ECU or a DCU, or may be a semiconductor chip disposed in a device such as an ECU or a DCU. The apparatus includes:

an obtaining module 510, configured to obtain configuration information of one or more sensors;

a loading module 520, configured to load a corresponding data processing plug-in for each sensor based on the configuration information; and a generation module 530, configured to receive, by each data processing plug-in, data of a corresponding sensor, and convert, by each data processing plug-in, the received data of the corresponding sensor into data in a specified format.

The sensor information in the loading module 520 includes an identifier and/or a type of a sensor and/or a quantity of sensors.

The sensor configuration information in the loading module 520 includes an I/O port configured for each sensor.

The configuration information of a sensor comprises an identifier or a type of the sensor.

The configuration information of the sensor further includes:

an I/O port of the sensor.

That each data processing plug-in receives the data of the corresponding sensor includes:

the data processing plug-in receives the data of the sensor through an I/O port of the corresponding sensor.

The configuration information further includes a data flow relationship between the I/O port and the data processing plug-in.

That each data processing plug-in converts the received data of the corresponding sensor into data in a specified format includes:

each data processing plug-in converts the received data of the corresponding sensor into the data in the specified format based on the data flow relationship.

The configuration information in the obtaining module 510 and the loading module 520 further includes a quantity of sensors.

The sensor data processing apparatus further includes:

a sending module 540, configured to send the data in the specified format to an upper-layer application.

Figure 9:
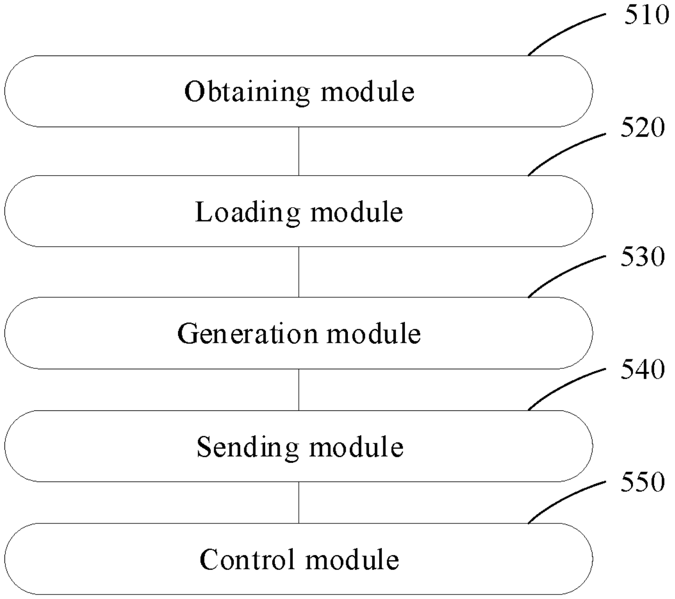
FIG. 9 is a schematic diagram of a structure of a vehicle control apparatus according to an embodiment of this application.

As shown in FIG. 9, another embodiment of this application provides a vehicle control apparatus, including the sensor data processing apparatus in the foregoing embodiment and a control module 550. The control module 550 is configured to apply the data in the specified format to control a vehicle.

Figure 10:
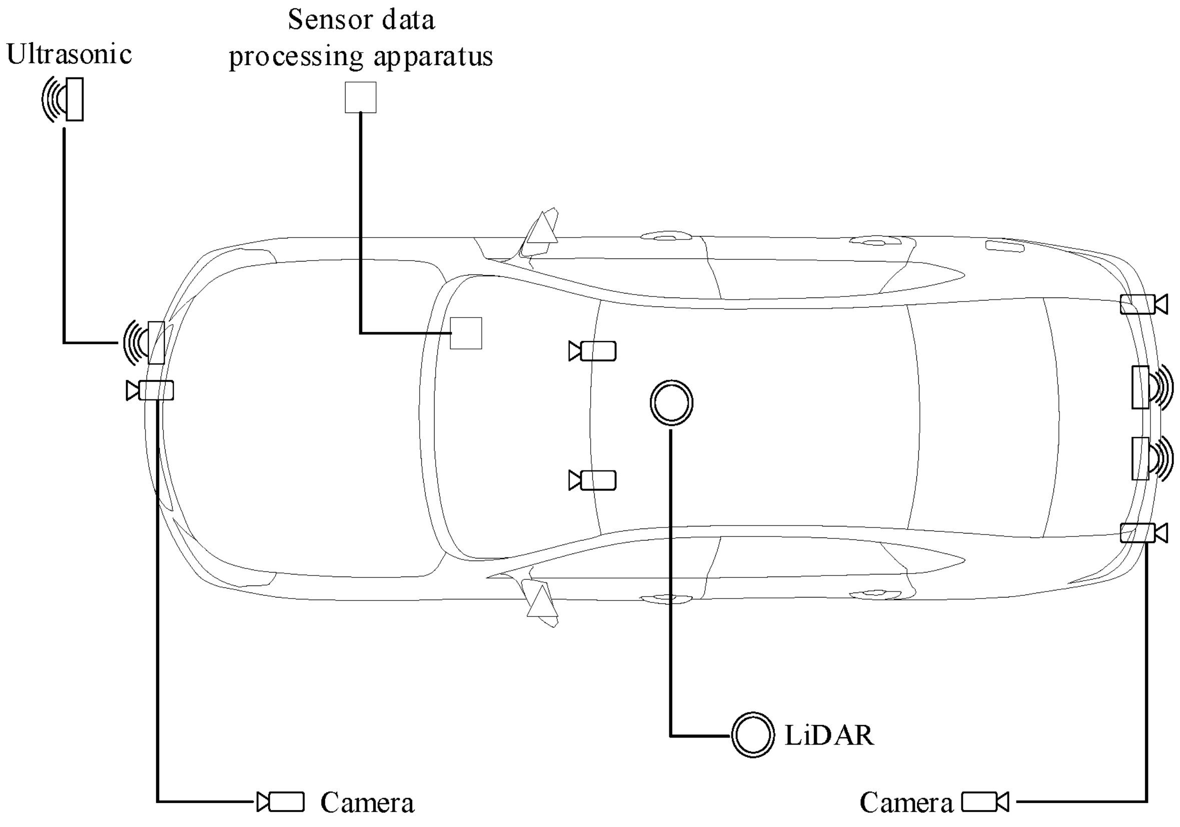
FIG. 10 is a schematic diagram of a structure of a vehicle according to an embodiment of this application.

As shown in FIG. 10, another embodiment of this application provides a vehicle, including a plurality of sensors and the sensor data processing apparatus in the foregoing embodiment.

Figure 11:
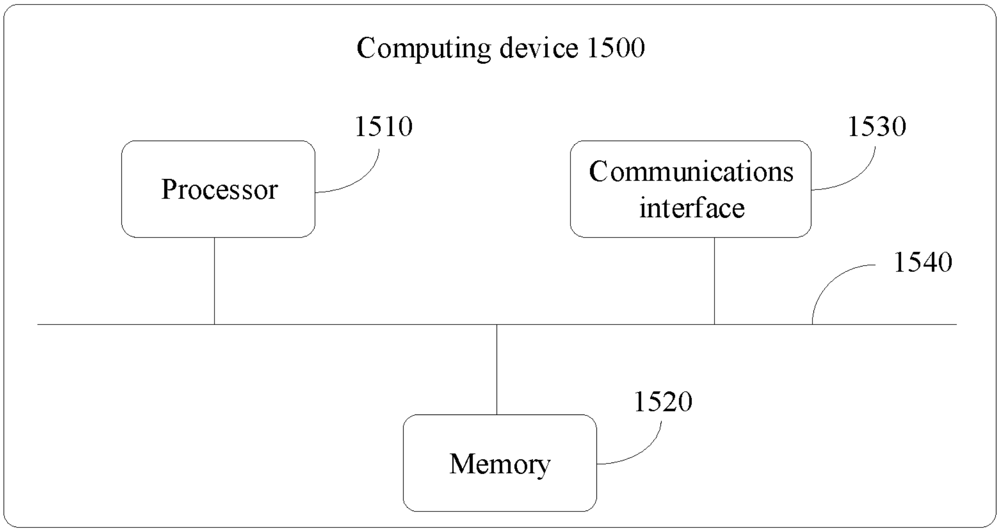
FIG. 11 is a schematic diagram of a structure of a computing device according to an embodiment of this application.

FIG. 11 is a schematic diagram of a structure of a computing device 1500 according to an embodiment of this application. The computing device 1500 includes a processor 1510, a memory 1520, a communications interface 1530, and a bus 1540.

It should be understood that the communications interface 1530 in the computing device 1500 shown in FIG. 11 may be used for communication with another device.

The processor 1510 may be connected to the memory 1520. The memory 1520 may be configured to store program code and data. Therefore, the memory 1520 may be a storage unit in the processor 1510, an external storage unit independent of the processor 1510, or a component including a storage unit in the processor 1510 and an external storage unit independent of the processor 1510.

Optionally, the computing device 1500 may further include the bus 1540. The memory 1520 and the communications interface 1530 may be connected to the processor 1510 by using the bus 1540. The bus 1540 may be a peripheral component interconnect (PCI) bus, an extended industry standard architecture (EISA) bus, or the like. The bus 1540 may be classified into an address bus, a data bus, a control bus, and the like. For ease of indication, the bus is indicated by using only one line in FIG. 11. However, it does not indicate that there is only one bus or only one type of bus.

It should be understood that in this embodiment of this application, the processor 1510 may be a central processing unit (CPU). Alternatively, the processor may be another general-purpose processor, a digital signal processor (DSP), an application-specific integrated circuit (ASIC), a field programmable gate array (FPGA) or another programmable logic device, a discrete gate or transistor logic device, or a discrete hardware component, or the like. The general-purpose processor may be a microprocessor, or the processor may be any conventional processor or the like. Alternatively, the processor 1510 uses one or more integrated circuits to execute a related program, to implement the technical solutions provided in the embodiments of this application.

The memory 1520 may include a read-only memory and a random access memory, and provide instructions and data for the processor 1510. A part of the processor 1510 may further include a non-volatile random access memory. For example, the processor 1510 may further store information of a device type.

When the computing device 1500 runs, the processor 1510 executes computer-executable instructions in the memory 1520 to perform the operation steps of the foregoing method.

It should be understood that the computing device 1500 according to this embodiment of this application may correspond to a corresponding execution body of the method according to each embodiment of this application, and the foregoing and other operations and/or functions of modules in the computing device 1500 are respectively intended to implement corresponding procedures of the methods in the embodiments. For brevity, details are not described herein again.

A person of ordinary skill in the art may be easily aware that units and algorithm steps in the examples described with reference to the embodiments disclosed in this specification can be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiments are merely examples. For example, the division of units is merely logical function division and may be other division in actual implementation. For example, a plurality of units or components may be combined or integrated into another system, or some features may be ignored or may not be performed. In addition, the displayed or discussed mutual associations, direct associations, or communications connections may be implemented through some interfaces. The indirect associations or communications connections between apparatuses or units may be implemented in electrical, mechanical, or other forms.

The units described as separate parts may or may not be physically separate and parts displayed as units may or may not be physical units, meaning that they may be located in one position or distributed on a plurality of network elements. Some or all of the units may be selected based on an actual requirement, to achieve the objectives of the solutions in the embodiments.

In addition, functional units in the embodiments of this application may be integrated into one processing unit, or each of the units may exist alone physically, or two or more units may be integrated into one unit.

When the functions are implemented in a form of a software functional unit and sold or used as a separate product, the functions may be stored in a computer-readable storage medium. Based on such an understanding, the technical solutions of the application substantially or parts making contributions to the conventional art or part of the technical solutions may be embodied in a form of software product, and the computer software product is stored in a storage medium, including a plurality of instructions configured to enable a computer device (which may be a personal computer, a server, a network device or the like) to execute all or part of the steps of the method in each embodiment of the application. The foregoing storage medium includes any medium that can store program code, such as a USB flash drive, a removable hard disk, a read-only memory (ROM), a random access memory (RRAM), a magnetic disk, or an optical disc.

An embodiment of this application further provides a computer-readable storage medium. The computer-readable storage medium stores a computer program, and when the program is executed by a processor, the program is used to perform a sensor data processing method. The method includes at least one of the solutions described in the foregoing embodiments.

The computer storage medium in this embodiment of this application may be any combination of one or more computer-readable media. The computer-readable medium may be a computer-readable signal medium or a computer-readable storage medium. The computer-readable storage medium may be, for example, but not limited to, an electric, magnetic, optical, electromagnetic, infrared, or semiconductor system, apparatus, or device, or any combination thereof. More specific examples (a non-exhaustive list) of the computer-readable storage medium include: an electrical connection having one or more conducting wires, a portable computer disk, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any appropriate combination thereof. In this specification, the computer-readable storage medium may be any tangible medium containing or storing a program. The program may be used by an instruction execution system, apparatus, or device, or may be used in combination with an instruction execution system, apparatus, or device.

The computer-readable signal medium may include a data signal propagated in a baseband or as part of a carrier, where the data signal carries computer-readable program code. The propagated data signal may be in a plurality of forms, including but not limited to an electromagnetic signal, an optical signal, or any appropriate combination thereof. The computer-readable signal medium may alternatively be any computer-readable medium other than the computer-readable storage medium. The computer-readable medium may send, propagate, or transmit the program used by the instruction execution system, apparatus, or device, or used in combination with the instruction execution system, apparatus, or device.

The program code included in the computer-readable medium may be transmitted by using any appropriate medium, including but not limited to radio, a wire, an optical cable, RF, and the like, or any appropriate combination thereof.

Computer program code for performing the operations in this application may be compiled in one or more programming languages, or a combination thereof. The programming languages include an object-oriented programming language, such as Java, Smalltalk, or C++, and also include a conventional procedural programming language, such as a "C" language or a similar programming language. The program code may be executed completely on a user computer, partially on a user computer, as an independent software package, partially on a user computer and partially on a remote computer, or completely on a remote computer or server. In a case involving a remote computer, the remote computer may be connected to a user computer through any type of network, including a local area network (LAN) or a wide area network (WAN), or may be connected to an external computer (for example, connected through the Internet by using an Internet service provider).

It should be noted that the foregoing descriptions are merely example embodiments of this application and technical principles applied to the embodiments. A person skilled in the art understands that this application is not limited to the specific embodiments described herein, and a person skilled in the art can make various obvious changes, readjustments, and replacements without departing from the protection scope of this application. Therefore, although this application is described in detail by using the foregoing embodiments, this application is not limited to the foregoing embodiments, and more other equivalent embodiments may be included without departing from the concept of this application. All such embodiments shall fall within the protection scope of this application.

What is claimed is:

1. A sensor data processing method, including:

obtaining configuration information of one or more sensors, wherein the configuration information of a sensor comprises an I/O port of the sensor and an identifier or a type of the sensor;

loading a corresponding data processing plug-in for each sensor of the one or more sensors based on the configuration information of the one or more sensors;

configuring, for each of the one or more sensors, the corresponding I/O port to be associated with the corresponding data processing plug-in based on a configuration template, the configuration template based on a specific sensor deployment solution; and receiving, by each data processing plug-in, data of a corresponding sensor through an I/O port of the corresponding sensor; and converting, by each data processing plug-in, the received data of the corresponding sensor into data in a specified data format by encapsulating the received data in the specified data format.

2. The method according to claim 1, wherein the configuration information further comprises a data flow relationship between the I/O port of the sensor and the data processing plug-in; and the converting, by each data processing plug-in, the received data of the corresponding sensor into data in a specified data format by encapsulating the received data in the specified data format comprises:

converting, by each data processing plug-in, the received data of the corresponding sensor into the data in the specified data format based on the data flow relationship.

3. The method according to claim 2, wherein the configuration information further comprises a quantity of sensors.

4. The method according to claim 1, further comprising: sending the data in the specified data format to an upper-layer application.

5. The method according to claim 1, further comprising: applying the data in the specified data format to control a vehicle.

6. A sensor data processing apparatus, comprising:

at least one processor; and at least one memory, wherein the memory stores program instructions, and when the program instructions are executed by the at least one processor, the sensor data processing apparatus is enabled to implement a sensor data processing method, wherein the method comprises:

obtaining configuration information of one or more sensors, wherein the configuration information of a sensor comprises an I/O port of the sensor and an identifier or a type of the sensor;

loading a corresponding data processing plug-in for each sensor of the one or more sensors based on the configuration information of the one or more sensors;

configuring, for each of the one or more sensors, the corresponding I/O port to be associated with the corresponding data processing plug-in based on a configuration template, the configuration template based on a specific sensor deployment solution; and receiving, by each data processing plug-in, data of a corresponding sensor through an I/O port of the corresponding sensor, and converting, by each data processing plug-in, the received data of the corresponding sensor into data in a specified data format by encapsulating the received data in the specified data format.

7. The apparatus according to claim 6, wherein the configuration information further comprises a data flow relationship between the I/O port of the sensor and the data processing plug-in; and the converting, by each data processing plug-in, the received data of the corresponding sensor into data in a specified data format by encapsulating the received data in the specified data format comprises:

converting, by each data processing plug-in, the received data of the corresponding sensor into the data in the specified data format based on the data flow relationship.

8. The apparatus according to claim 7, wherein the configuration information further comprises a quantity of sensors.

9. The apparatus according to claim 6, the method further comprising: sending the data in the specified data format to an upper-layer application.

10. A vehicle comprises one or more sensors, and a sensor data processing apparatus, wherein the apparatus is configured to:

obtain configuration information of the one or more sensors, wherein the configuration information of a sensor comprises an I/O port of the sensor and an identifier or a type of the sensor;

load a corresponding data processing plug-in for each sensor of the one or more sensors based on the configuration information of the one or more sensors;

configure, for each of the one or more sensors, the corresponding I/O port to be associated with the corresponding data processing plug-in based on a configuration template, the configuration template based on a specified vehicle model and/or based on a specific sensor deployment solution; and receive, by using each data processing plug-in, data of a corresponding sensor through an I/O port of the corresponding sensor, and convert, by using each data processing plug-in, the received data of the corresponding sensor into data in a specified data format by encapsulating the received data in the specified data format.

11. The vehicle according to claim 10, wherein the configuration information further comprises a data flow relationship between the I/O port of the sensor and the data processing plug-in, and the apparatus is configured to:

convert the received data of the corresponding sensor into the data in the specified data format by using the data processing plug-in based on the data flow relationship.

12. The vehicle according to claim 11, wherein the configuration information further comprises a quantity of sensors.

13. The vehicle according to claim 10, wherein the apparatus is further configured to: send the data in the specified data format to an upper-layer application.

14. The vehicle according to claim 10, wherein the apparatus is further configured to: apply the data in the specified data format to control the vehicle.

15. The method according to claim 1, wherein the I/O port is one of a controller area network (CAN) port, a CAN with flexible data rate (CANFD) port, a universal asynchronous receiver and transmitter (UART) port or a robot operating system (ROS) port.

16. The apparatus according to claim 6, wherein the I/O port is one of a controller area network (CAN) port, a CAN with flexible data rate (CANFD) port, a universal asynchronous receiver and transmitter (UART) port or a robot operating system (ROS) port.

17. The vehicle according to claim 10, wherein the I/O port is one of a controller area network (CAN) port, a CAN with flexible data rate (CANFD) port, a universal asynchronous receiver and transmitter (UART) port or a robot operating system (ROS) port.

* * * * *